(12) United States Patent
Wu

(10) Patent No.: US 8,794,557 B2
(45) Date of Patent: Aug. 5, 2014

(54) ELECTRIC SEASONING MILL

(71) Applicant: Yienn Lih Enterprise Co., Ltd., Tainan (TW)

(72) Inventor: Ming-Feng Wu, Tainan (TW)

(73) Assignee: Yienn Lih Enterprise Co., Ltd. (TW)

( * ) Notice: Subject to any disclaimer, the term of this patent is extended or adjusted under 35 U.S.C. 154(b) by 27 days.

(21) Appl. No.: 13/782,229

(22) Filed: Mar. 1, 2013

(65) Prior Publication Data

US 2014/0175202 A1    Jun. 26, 2014

(30) Foreign Application Priority Data

Dec. 26, 2012    (TW) .............................. 101225157 U

(51) Int. Cl.
*A47J 42/00*    (2006.01)
*A47J 42/38*    (2006.01)

(52) U.S. Cl.
CPC ...................................... *A47J 42/38* (2013.01)
USPC .................................................... 241/169.1

(58) Field of Classification Search
USPC ....................................... 241/168, 169.1, 258
See application file for complete search history.

(56) References Cited

U.S. PATENT DOCUMENTS

| | | | | |
|---|---|---|---|---|
| 3,734,417 A * | 5/1973 | Russell et al. | ................ | 241/168 |
| 4,925,150 A * | 5/1990 | Tedioli | ........................ | 241/169.1 |
| 5,022,591 A * | 6/1991 | Sanders | ...................... | 241/169.1 |
| 6,966,510 B2 * | 11/2005 | Pai | .............................. | 241/169.1 |
| 7,059,553 B2 * | 6/2006 | Mueller | ................... | 241/199.12 |
| 7,077,347 B1 * | 7/2006 | Wang | ......................... | 241/169.1 |
| 7,293,728 B2 * | 11/2007 | Chan et al. | ................... | 241/169 |
| 7,604,189 B2 * | 10/2009 | Wang | ......................... | 241/169.1 |
| 7,762,488 B2 * | 7/2010 | Wu | ............................. | 241/169.1 |
| 2004/0155130 A1 * | 8/2004 | Wang | ......................... | 241/169.1 |
| 2004/0164193 A1 * | 8/2004 | Yang | ......................... | 241/169.1 |
| 2008/0237380 A1 * | 10/2008 | Kalogroulis et al. | ...... | 241/169.1 |
| 2009/0057452 A1 * | 3/2009 | Tang | ......................... | 241/169.1 |
| 2010/0108793 A1 * | 5/2010 | Wu | ............................. | 241/169.1 |
| 2013/0026269 A1 * | 1/2013 | Pai | ............................. | 241/169.1 |

\* cited by examiner

*Primary Examiner* — Faye Francis
(74) *Attorney, Agent, or Firm* — Schwegman Lundberg & Woessner, P.A.

(57) ABSTRACT

An electric seasoning mill includes a grinding mechanism that is driven by a driving mechanism to grind seasonings, and a control unit that includes a control seat, a control element disposed in and movable relative to the control seat, and a resilient element disposed for biasing the control seat away from the driving mechanism. When the control seat is pressed toward the driving mechanism, the electric seasoning mill is operable from a power-off state, where the control element is away from the driving mechanism, to a power-on state, where the electric seasoning mill is convertible between activating and deactivating positions for controlling contact between the control element and the driving mechanism.

6 Claims, 10 Drawing Sheets

ELECTRIC SEASONING MILL

CROSS-REFERENCE TO RELATED APPLICATION

This application claims priority of Taiwanese Application No. 101225157, filed on Dec. 26, 2012.

FIELD OF THE INVENTION

The invention relates to an electric mill, more particularly to an electric seasoning mill that can be used to grind seasonings such as peppercorns, coarse salt, etc.

DESCRIPTION OF THE RELATED ART

Referring to FIGS. 1 and 2, U.S. Pat. No. 6,830,205 discloses a conventional electric pepper mill comprising a main body 51, a top cover 50 coupled rotatably to top of the main body 51, a plurality of batteries 52 mounted in the main body 51, a conducting unit 53 mounted among the batteries 52, a motor 54 connected electrically to the batteries 52, a transmission shaft 55 driven rotatably by the motor 54, an inner grinding seat 56 coupled co-rotatably to the transmission shaft 55, and a stationary outer grinding seat 57 surrounding the inner grinding seat 56. The top cover 50 includes a plurality of conductive segments (not shown) disposed at a bottom side thereof. The conducting unit 53 includes a pair of pins 531 connected electrically to the batteries 52, and a conducting body 532 operable to be in contact with or separated from the pins 531.

The top cover 50 can be used as the master switch of the conventional electric pepper mill. When the top cover 50 is rotated, the conductive segments of the top cover 50 are moved to contact electrically the batteries 52 such that the conventional electric pepper mill is turned to a power-on state. Consequently, when the conventional electric pepper mill is disposed at an upright standing position (see FIG. 1), the conducting body 532 contacts the pins 531 so that the transmission shaft 55 can be driven by the motor 54 to rotate, and that the inner grinding seat 56 is rotated relative to the outer grinding seat 57 for grinding peppercorns. When the conventional electric pepper mill is inverted upside down (see FIG. 2), the conducting body 532 is moved away from the pins 531 due to gravity to disable the rotation of the transmission shaft 55 and the inner grinding seat 56 by the motor 54. Therefore, the conventional electric pepper mill can be activated and deactivated by virtue of the movement of the conducting body 532. When the conventional electric pepper mill is not in use, the top cover 50 is reversely rotated such that the conductive segments are separated from the batteries 52 to turn the conventional electric pepper mill to a power-off state.

However, since the conductive segments are made of metal sheets, oxidation may occur to adversely affect the conductivity thereof. Moreover, after a long period of use, the conductive segments may wear off due to friction between the conductive segments and the batteries.

SUMMARY OF THE INVENTION

Therefore, an object of the present invention is to provide an electric seasoning mill that can alleviate the abovementioned drawbacks associated with the prior art.

Accordingly, an electric seasoning mill of the present invention comprises a receiving unit, a driving mechanism, a grinding mechanism and a control unit. The receiving unit surrounds an axis. The driving mechanism is mounted in the receiving unit, and includes a motor and a battery unit that is connected electrically to the motor and that has at least one battery. The grinding mechanism is disposed at one side of the driving mechanism, and includes a transmission shaft that extends along the axis and that is driven rotatably by the motor, an inner grinding seat that is coupled co-rotatably to the transmission shaft, and a stationary outer grinding seat that surrounds the inner grinding seat. The control unit is disposed at an opposite side of the driving mechanism along the axis, and includes a control seat, a control element that is disposed in the control seat and that is movable relative to the control seat along the axis, and a resilient element that is disposed for biasing the control seat away from the driving mechanism along the axis. The control seat has a support rod disposed at an end of the control element along the axis, and an abutment wall disposed at an opposite end of the control element along the axis. When the abutment wall of the control seat is pressed toward the driving mechanism along the axis against biasing action of the resilient element, the electric seasoning mill is operable from a power-off state, where the control element is away from the at least one battery, to a power-on state, where the electric seasoning mill is convertible between an activating position, where the grinding mechanism is disposed under the control unit and where the control element contacts electrically the at least one battery, and a deactivating position, where the grinding mechanism is disposed above the control unit and where the control element is separated from the at least one battery.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
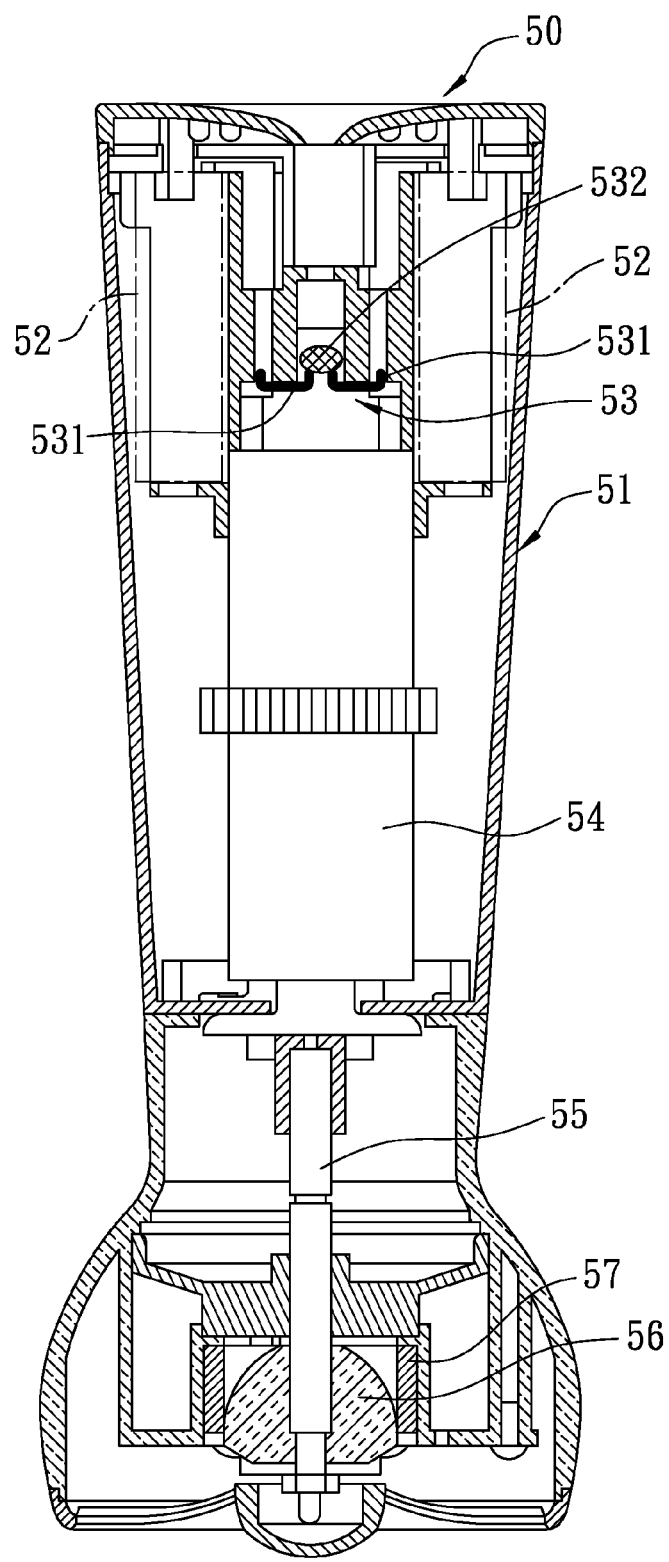
FIG. 1 is a sectional view of a conventional electric pepper mill standing in an upright standing position.
Figure 2:
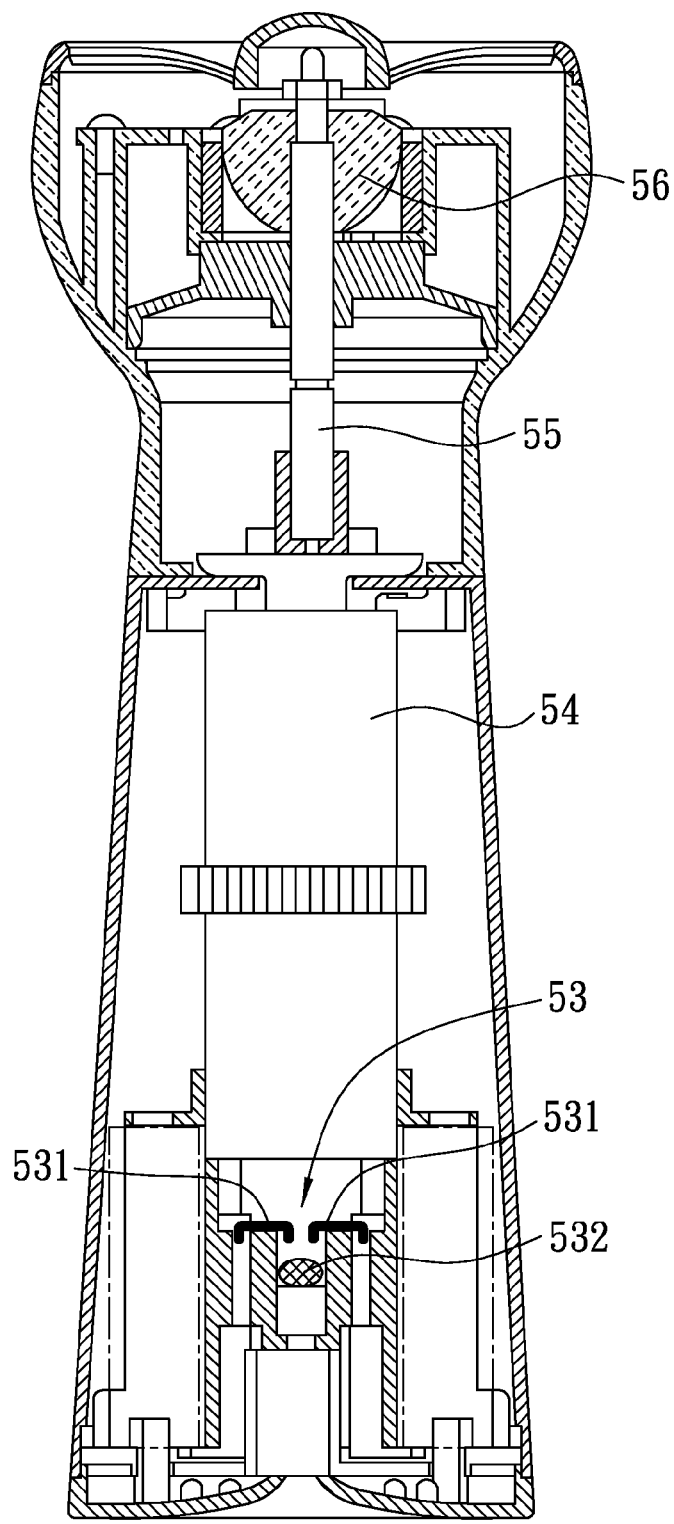
FIG. 2 is a sectional view of the conventional electric peppermill turned upside down from the upright standing position.
Figure 3:
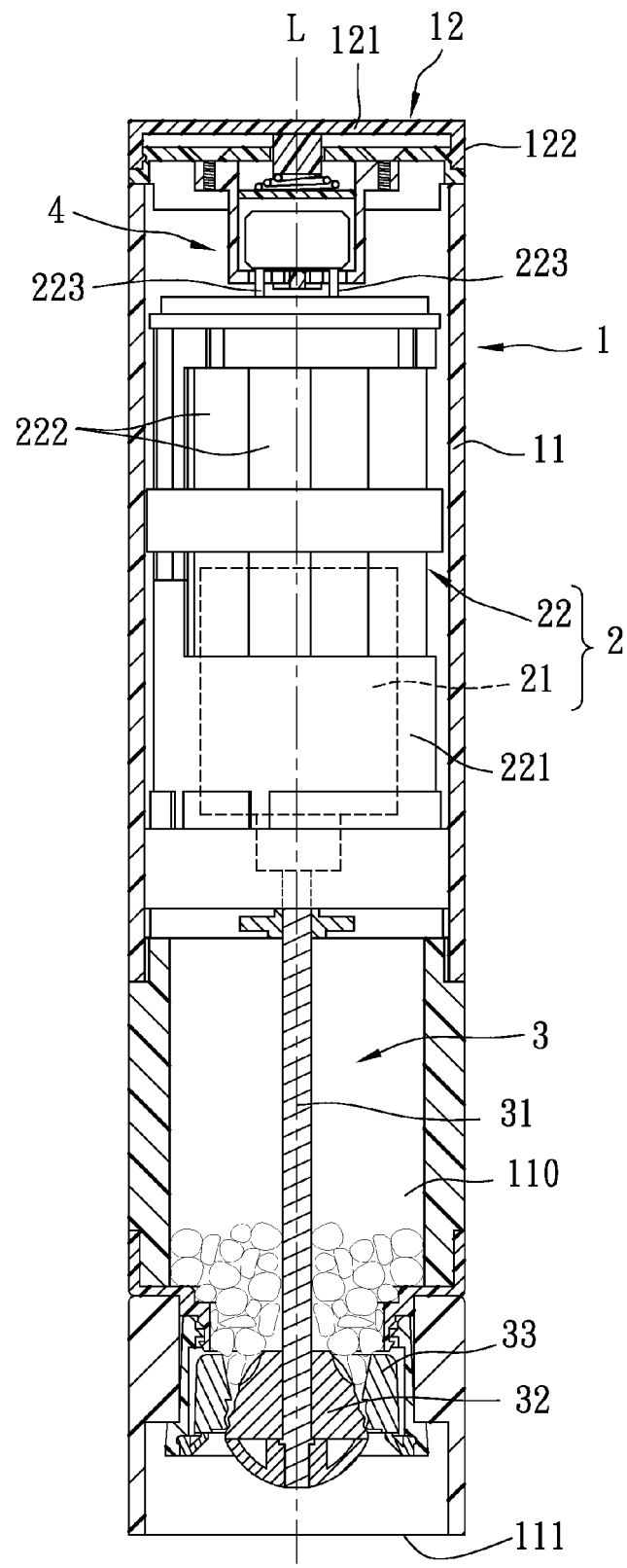
FIG. 3 is a partly sectional view of a preferred embodiment of an electric seasoning mill according to this invention.
Figure 4:
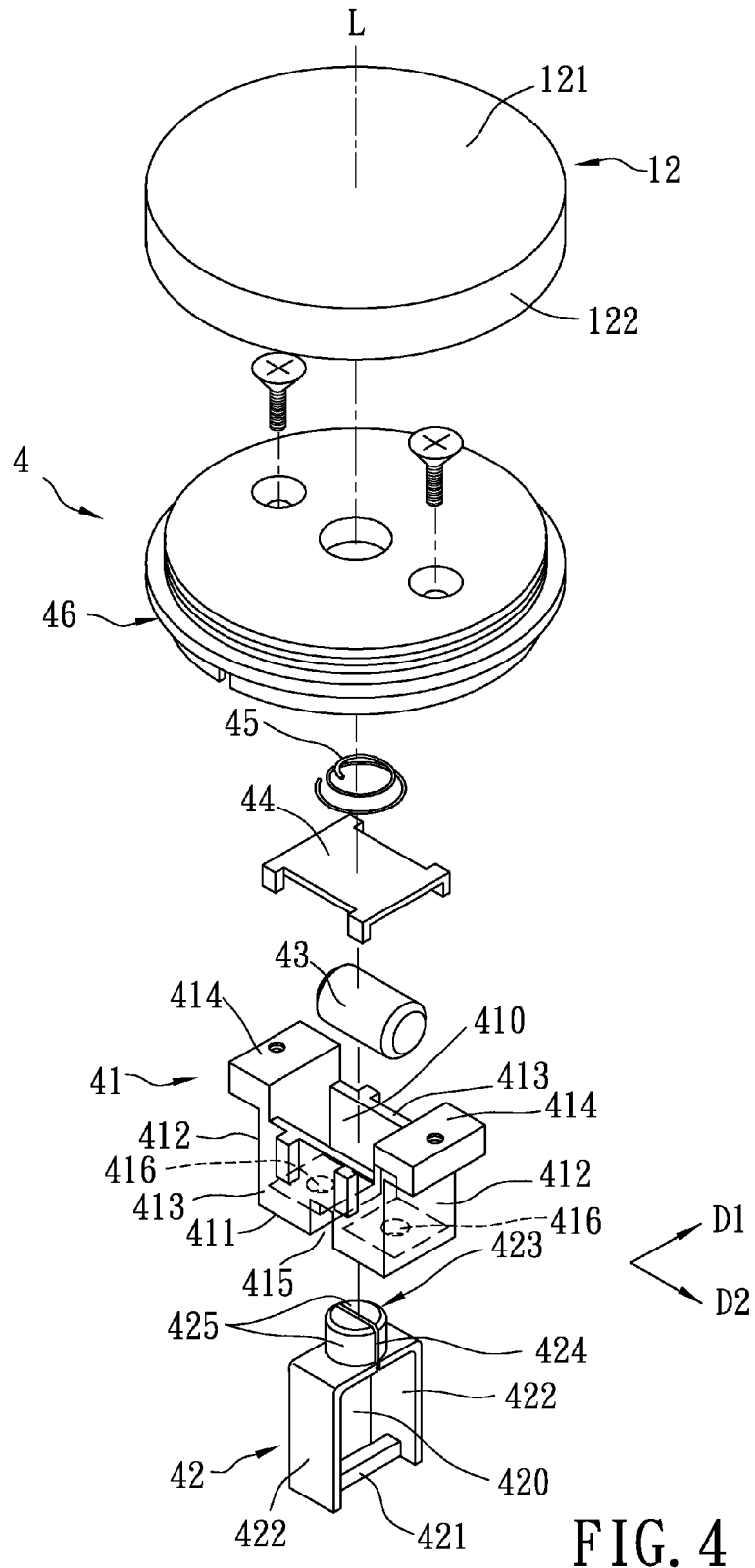
FIG. 4 is an exploded perspective view of a control unit and a cover member of the preferred embodiment.
Figure 5:
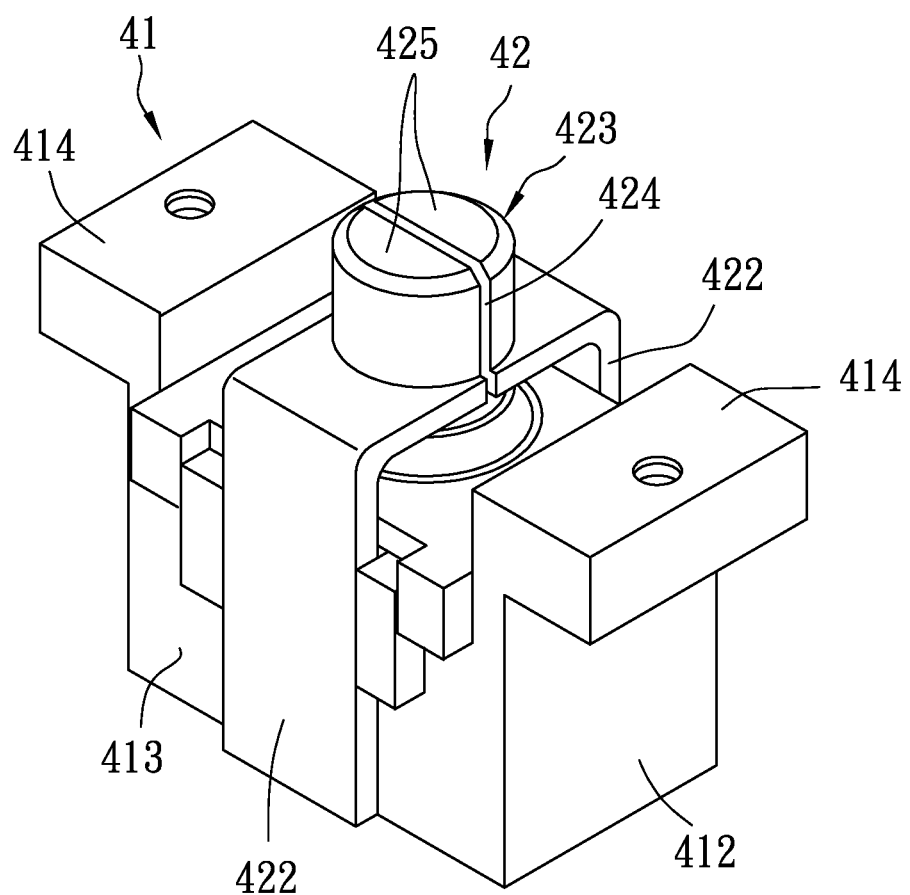
FIG. 5 is an assembled perspective view of the control unit of the preferred embodiment.

Referring to FIGS. 3 to 5, the preferred embodiment of an electric seasoning mill according to this invention includes a receiving unit 1, a driving mechanism 2 mounted in the receiving unit 1, a grinding mechanism 3 and a control unit 4.

The receiving unit 1 includes a hollow body 11 surrounding an axis (L), and a cover body 12 coupled removably and rotatably on top of the hollow body 11 and cooperating with the hollow body 11 to define a receiving space 110 for accommodating to-be-ground seasonings, such as peppercorns, coarse salt, etc. The hollow body 11 is formed with a discharge opening 111 at a bottom end thereof and in spatial communication with the receiving space 110. The cover body 12 includes a top wall 121 and a surrounding wall 122 extending from a periphery of the top wall 121.

The driving mechanism 2 includes a motor 21 and a battery unit 22 connected electrically to the motor 21. In this embodiment, the battery unit 22 includes a battery holder 221 mounted in the hollow body 11 and disposed in an upper half part of the receiving space 110, a plurality of batteries 222 disposed in the battery holder 221 and a pair of conducting elements 223 that are spaced apart from each other and that are connected electrically to the batteries 222. In this embodiment, the number of the batteries 222 may vary, and the conducting elements 223 may be configured as conductive pins, conductive plates, etc. Since the manner of electrical connection among the motor 21, the batteries 222 and the conducting elements 223 is known in the art, further details of the same are omitted herein for the sake of brevity.

The grinding mechanism 3 is disposed at one side of the driving mechanism 2, and includes a transmission shaft 31 extending along the axis (L) and driven rotatably by the motor 21, an inner grinding seat 32 coupled co-rotatably to the transmission shaft 31, and a stationary outer grinding seat 33 surrounding the inner grinding seat 32. During operation of the electric seasoning mill of this embodiment, the transmission shaft 31 and the inner grinding seat 32 are rotated relative to the outer grinding seat 33 so as to grind the seasonings between the inner and outer grinding seats 32, 33.

Referring to FIGS. 4 to 7, the control unit 4 is disposed at an opposite side of the driving mechanism 2 along the axis (L), and includes a mounting seat 41, a control seat 42, a control element 43, a loading board 44, a resilient element 45 and a top seat 46.

The mounting seat 41 has a base wall 411 having opposite first edges in a first direction (D1) that is transverse to the axis (L) and opposite second edges in a second direction (D2) that is transverse to the axis (L) and the first direction (D1), a pair of first sidewalls 412 extending respectively from the second edges of the base wall 411 and extending away from the driving mechanism 2, a pair of second sidewalls 413 extending respectively from the first edges of the base wall 411, extending away from the driving mechanism 2 and cooperating with the first side walls 412 and the base wall 411 to define an accommodation space 410, and a pair of mounting walls 414 extending respectively from top edges of the second sidewalls 412 and extending away from each other. The base wall 411 is formed with a groove channel 415 extending in the first direction (D1) through the first edges, and a pair of through holes 416 disposed at opposite lateral sides of the groove channel 415 in the second direction (D2). The conducting elements 223 of the battery unit 22 are extendable into the through holes 416, respectively.

The control seat 42 is made of flexible plastic, and has a support rod 421 extending in the first direction (D1) and engaging the groove channel 415 of the mounting seat 41, a pair of end walls 422 extending respectively from opposite ends of the support rod 421 and disposed respectively at outer sides of the second sidewalls 413 of the mounting seat 41, and an abutment wall 423 that is spaced apart from the support rod 421 along the axis (L), that interconnects distal ends of the end walls 422 and that is disposed at a side of the second sidewalls 413 opposite to the base wall 411 along the axis (L). The support rod 421, the end walls 422 and the abutment wall 423 cooperatively define a retaining space 420 thereamong. The control seat 42 further has a slit 424 extending through the abutment wall 423 and in spatial communication with the retaining space 420 as to divide the abutment wall 423 into a pair of spaced-apart abutment wall segments 425.

In this embodiment, the control element 43 is a metal post, is retained in the accommodation space 410 of the mounting seat 41, and is movable relative to the control seat 42 along the axis (L). As such, the support rod 421 and the abutment wall 423 are disposed at opposite ends of the control element 43 along the axis (L).

The loading board 44 interconnects fixedly distal ends of the second sidewalls 413 opposite to the base wall 411 along the axis (L). The resilient element 45 has opposite ends secured respectively to the loading board 44 and the abutment wall 423 of the control seat 42 for biasing the control seat 42 away from the driving mechanism 2 along the axis (L). The top seat 46 is disposed between the mounting seat 41 and the cover member 12 and is secured to the mounting seat 41 via screws.

To assemble this embodiment, the control element 43 is first placed in the accommodation space 410 of the mounting seat 41, and then the loading board 44 and the resilient element 45 are fixed on the mounting seat 41. Afterward, the abutment wall segments 425 of the abutment wall 423 are pulled away from each other in the first direction (D1) to permit passage of assembly of the mounting seat 41, the control element 43, the loading board 44 and the resilient element 45 into the retaining space 420. Then, the top seat 46 is fastened on the mounting seat 41 to complete the assembly of the control unit 4. At this moment, the abutment wall 423 extends through the top seat 46.

Figure 6:
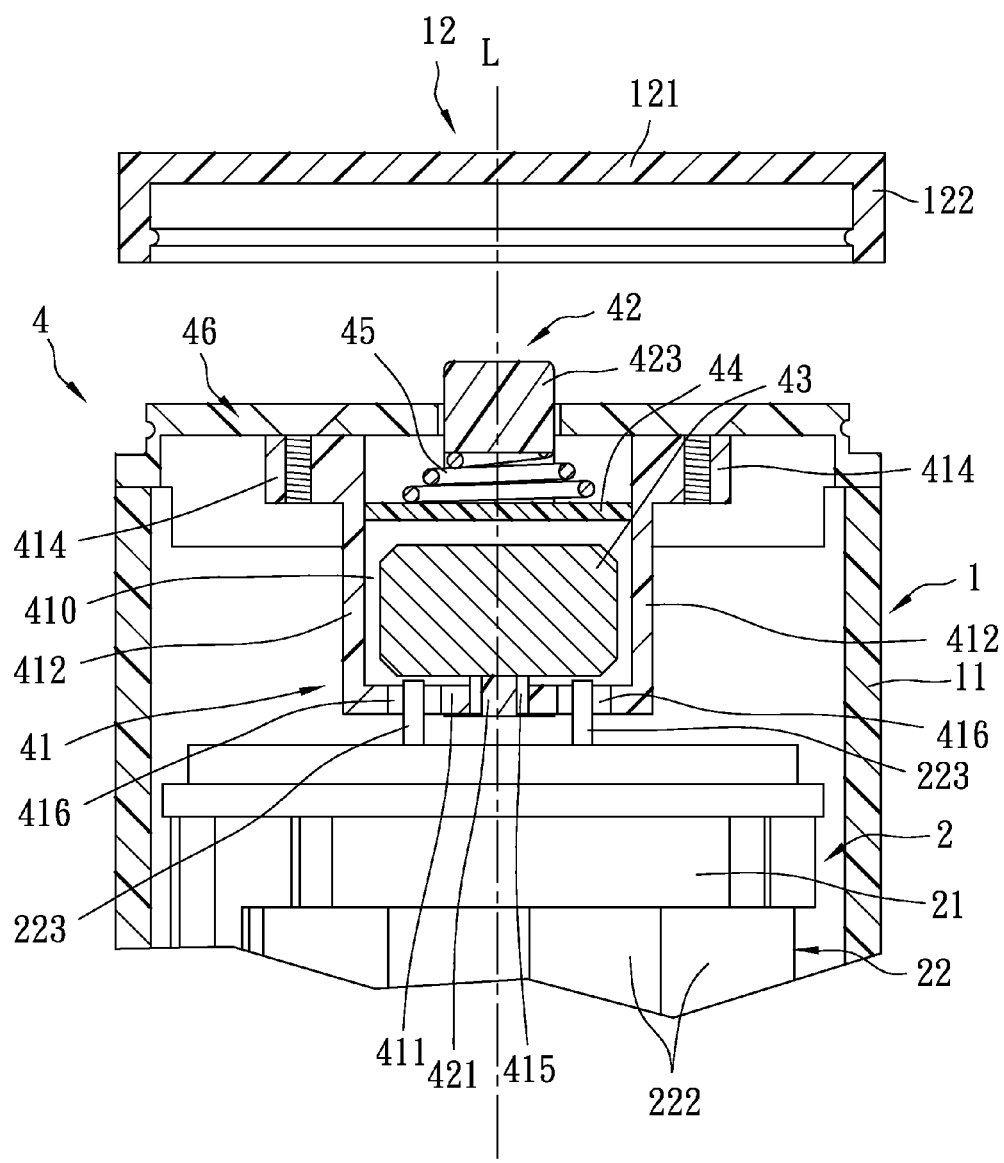
FIG. 6 is a partly exploded fragmentary sectional view of the preferred embodiment at a power-off state.
Figure 7:
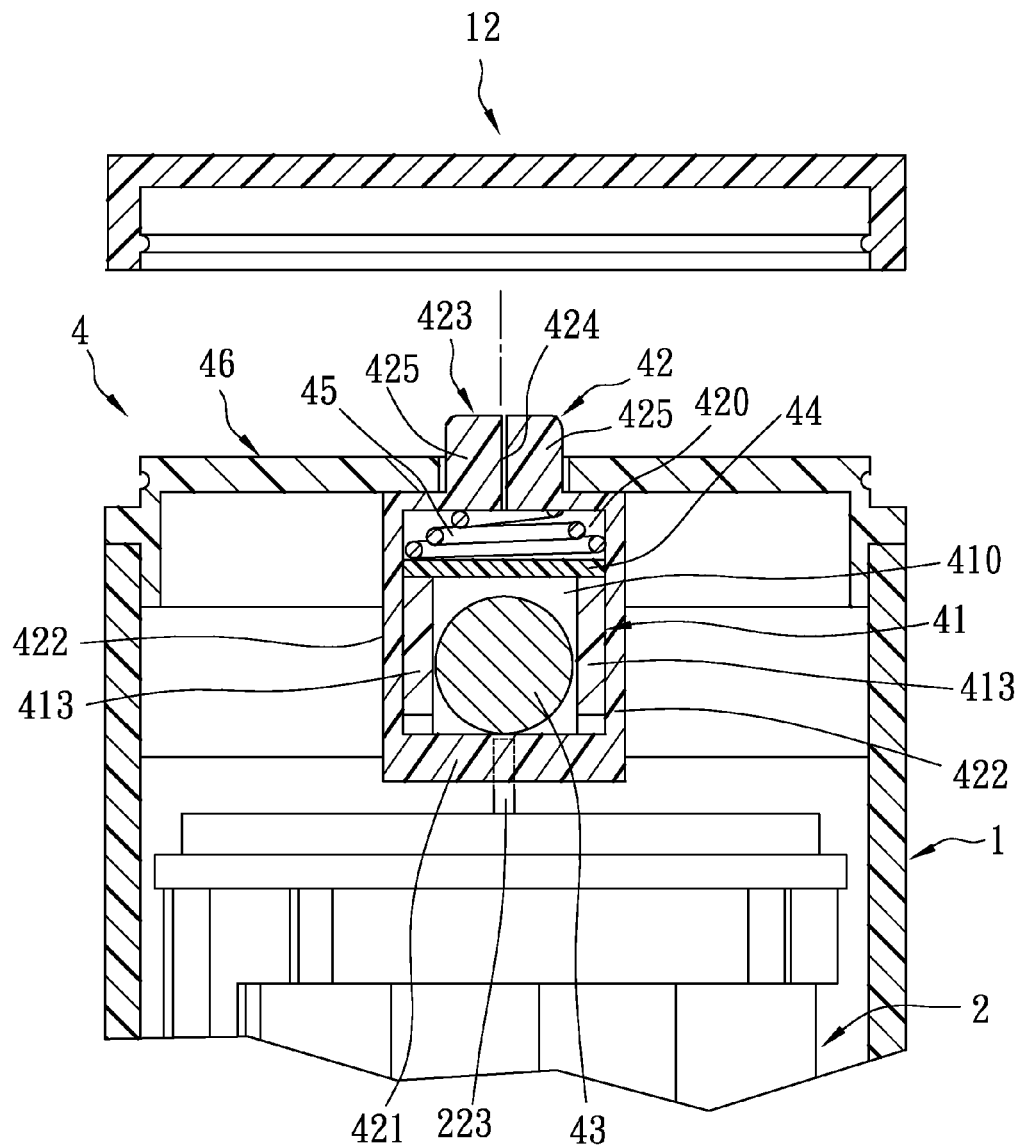
FIG. 7 is another partly exploded fragmentary sectional view of the preferred embodiment at the power-off state.

Referring to FIGS. 6 and 7, after the control unit 4 is coupled to the hollow body 11, and before the cover body 12 is coupled to the hollow body 11, the conducting elements 223 of the driving mechanism 2 extend respectively through the through holes 416 of the mounting seat 41 and protrude out a surface of the base wall 411 facing the accommodation space 410, and the support rod 421 extends through the groove channel 415 and protrudes out of the surface of the base wall 411 facing the accommodation space 410. At this moment, the electric seasoning mill is disposed at a power-off state, the portion of the support rod 421 that protrudes out of the base wall 411 is longer than that of each of the conducting elements 223 of the driving mechanism 2 so that the control element 43 abuts against the support rod 421 without contacting the conducting elements 223.

Figure 8:
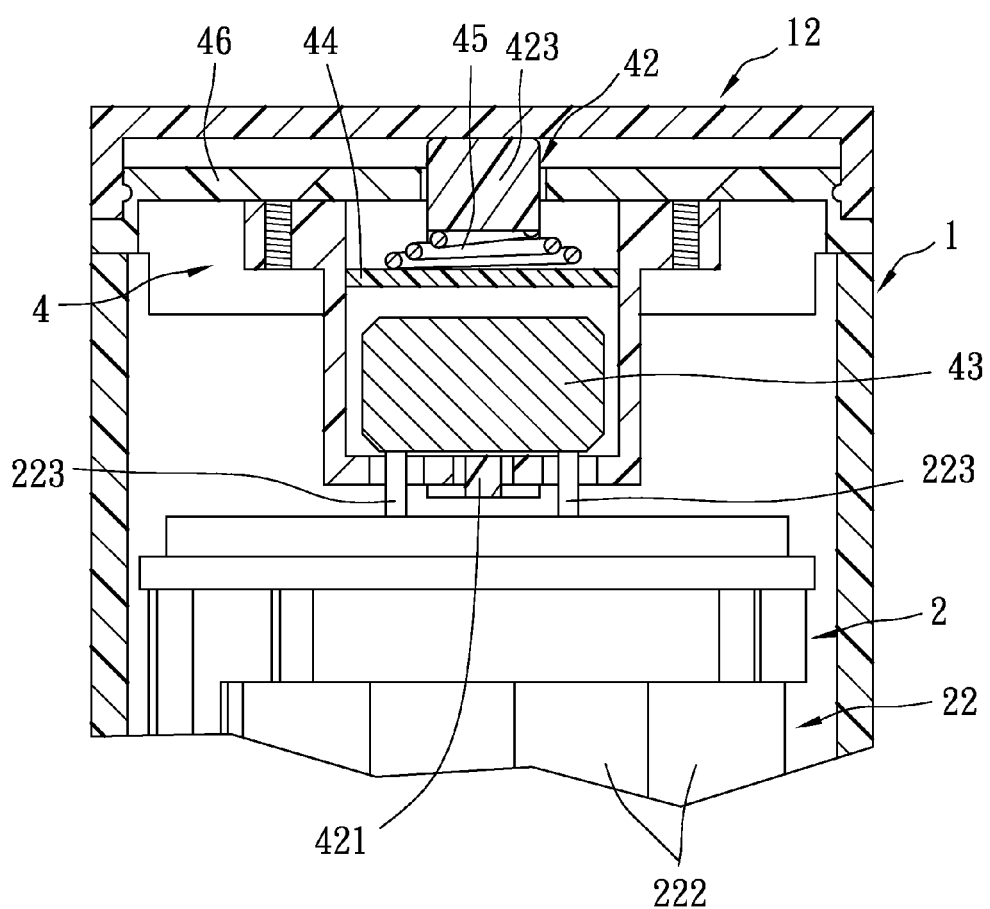
FIG. 8 is a fragmentary sectional view of the preferred embodiment at a power-on state and an activating position.
Figure 9:
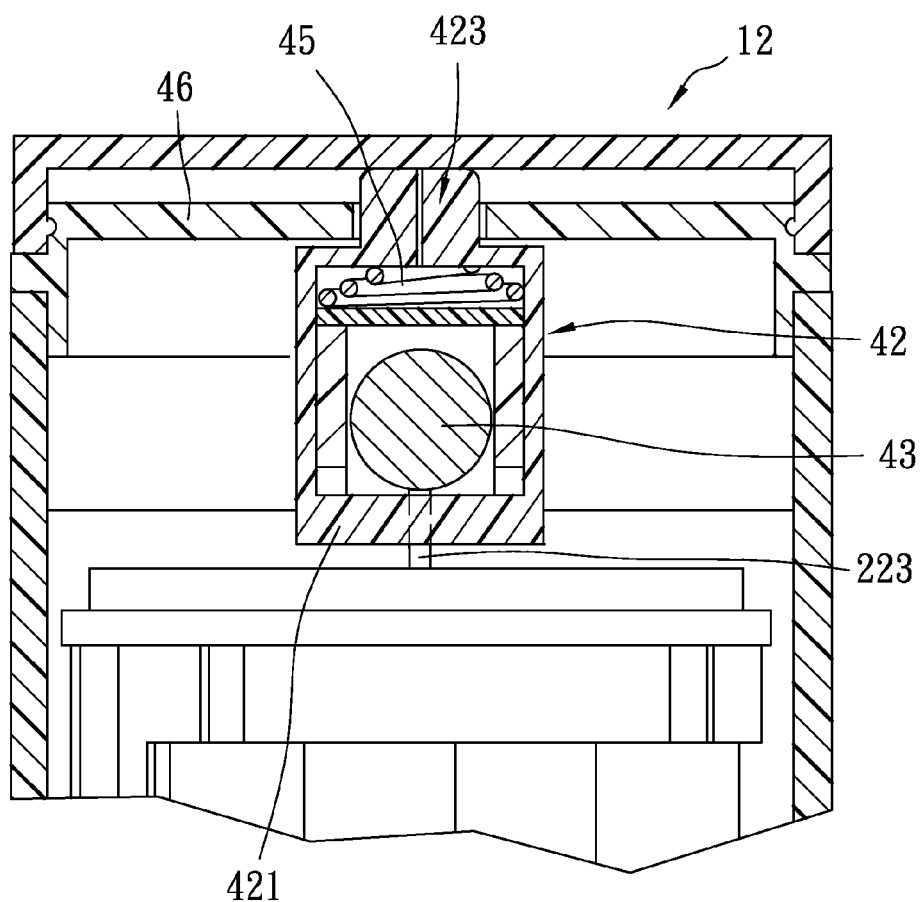
FIG. 9 is another fragmentary sectional view of the preferred embodiment at the power-on state and the activating position.

Referring to FIGS. 8 and 9, after the cover body 12 is coupled to the top seat 46 of the control unit 4, the abutment wall 423 of the control seat 42 is pressed by the cover body 12 toward the driving mechanism 2 against biasing action of the resilient element 45, thereby moving downwardly the control seat 42 relative to the mounting seat 41. As a result, the support rod 421 is retracted into the channel groove 415, and the control element 43 also moves downwardly to contact the conducting elements 223 to thereby turn the electric seasoning mill to a power-on state and be disposed at an activating position, such that grinding operation can be conducted.

Figure 10:
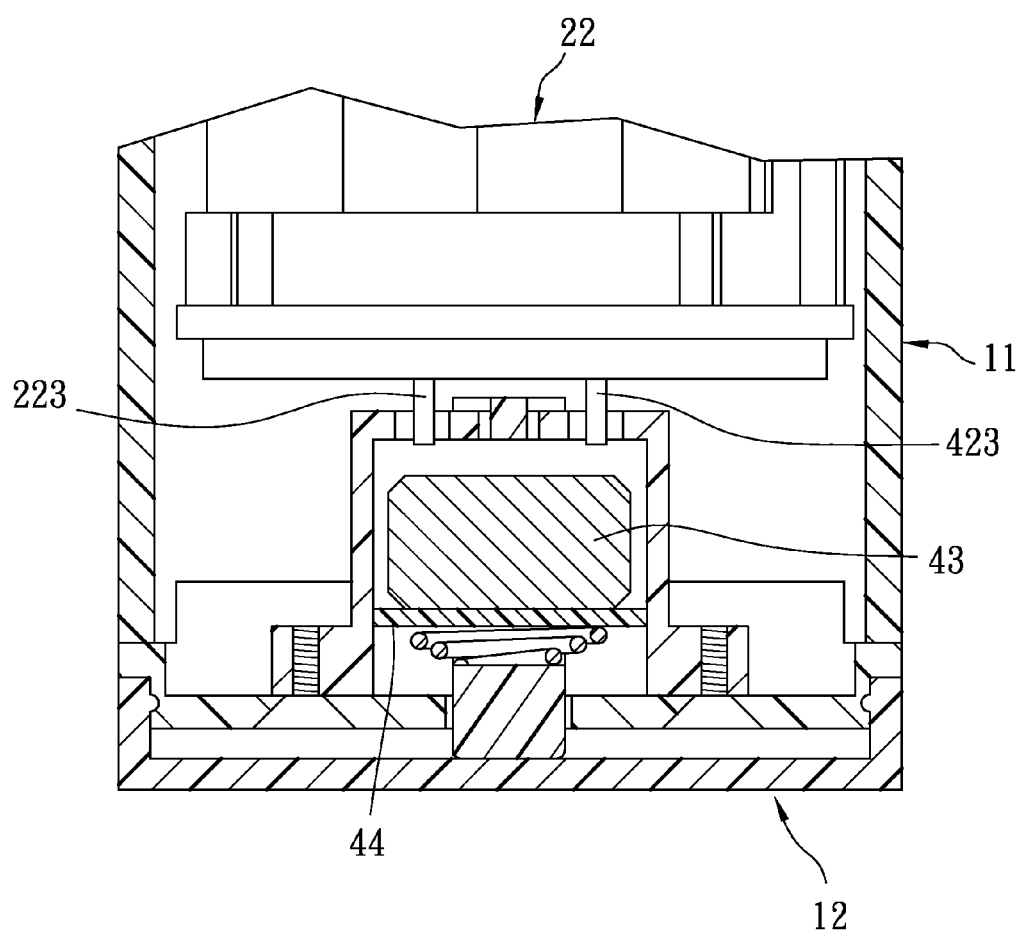
FIG. 10 is a fragmentary sectional view of the preferred embodiment at the power-on state and a deactivating position.

Referring further to FIG. 10, to stop the grinding operation, the electric seasoning mill is turned upside down to a deactivating position, such that the control element 43 would drop down on the loading board 44 by virtue of gravity and would be separated from the conducting elements 223, thereby automatically disabling the grinding operation of the electric seasoning mill.

To reactivate the grinding operation, the electric seasoning mill only needs to be turned from the deactivating position back to the activating position, and the control element 43 would move due to gravity to once again contact electrically the conducting elements 223.

When the electric seasoning mill is no longer needed, the cover body 12 can be taken off so that the control seat 42 is biased by the resilient element 45 to be away from the driving mechanism 2, thereby switching the electric seasoning mill to the power-off state.

It is worth to mention that, in other embodiments of this invention, the cover body 12 may be omitted, so that the abutment wall 423 of the control seat 42 can be pressed manually by a user to convert the electric seasoning mill from the power-off state to the power-on state. When the force exerted on the abutment wall 423 is removed, the control seat 42 would be biased by the resilient element 45 to turn the electric seasoning mill back to the power-off state.

To sum up, since the electric seasoning mill is switched from the power-off state to the power-on state by pressing the abutment wall 423 of the control seat 42 instead of rotating the control seat 42, wear of the control seat 42, the control element 43 and the conducting element 223 can be avoided. Moreover, since the control element 43 is enclosed by the mounting seat 41 and the loading board 44, oxidation of the control element 43 can be alleviated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electric seasoning mill comprising:
a receiving unit surrounding an axis;
a driving mechanism mounted in said receiving unit, and including a motor and a battery unit that is connected electrically to said motor and that has at least one battery;
a grinding mechanism disposed at one side of said driving mechanism, and including a transmission shaft that extends along the axis and that is driven rotatably by said motor, an inner grinding seat that is coupled co-rotatably to said transmission shaft, and a stationary outer grinding seat that surrounds said inner grinding seat; and
a control unit disposed at an opposite side of said driving mechanism along the axis, and including a control seat, a control element that is disposed in said control seat and that is movable relative to said control seat along the axis, and a resilient element that is disposed for biasing said control seat away from said driving mechanism along the axis, said control seat having a support rod disposed at an end of said control element along the axis and an abutment wall disposed at an opposite end of said control element along the axis;
wherein, when said abutment wall of said control seat is pressed toward said driving mechanism along the axis against biasing action of said resilient element, said electric seasoning mill is operable from a power-off state, where said control element is away from said at least one battery, to a power-on state, where said electric seasoning mill is convertible between an activating position, where said grinding mechanism is disposed under said control unit and where said control element contacts electrically said at least one battery, and a deactivating position, where said grinding mechanism is disposed above said control unit and where said control element is separated from said at least one battery.

2. The electric seasoning mill as claimed in claim 1, wherein:
said control unit further includes a mounting seat that has
a base wall having opposite first edges in a first direction that is transverse to the axis and opposite second edges in a second direction that is transverse to the axis and the first direction, and formed with a groove channel that extends in the first direction through said first edges,
a pair of first sidewalls extending respectively from said second edges of said base wall and extending away from said driving mechanism, and
a pair of second sidewalls extending respectively from said first edges of said base wall, extending away from said driving mechanism, and cooperating with said first sidewalls and said base wall to define an accommodation space that receives said control element;
said support rod of said control seat extends in the first direction and engages said groove channel to protrude out of a surface of said base wall facing said accommodation space for abutting against said control element when said electric seasoning mill is at the power-off state;
said control seat further has a pair of end walls extending respectively from opposite ends of said support rod and disposed respectively at outer sides of said second sidewalls of said mounting seat; and
said abutment wall interconnects distal ends of said end walls and is disposed at a side of said second sidewalls opposite to said base wall along the axis.

3. The electric seasoning mill as claimed in claim 2, wherein said control seat further has a slit extending through said abutment wall and dividing said abutment wall into a pair of spaced-apart abutment wall segments.

4. The electric seasoning mill as claimed in claim 2, wherein said base wall of said mounting seat is further formed with a pair of through holes disposed at opposite lateral sides of said groove channel in the second direction, said battery unit further including a pair of conducting elements that protrude out of said surface of said base wall facing said accommodation space, said control element contacting said conducting elements when said electric seasoning mill is at the power-on state and the activating position, and being separated from said conducting elements when said electric seasoning mill is at the power-off state or the deactivating position.

5. The electric seasoning mill as claimed in claim 2, wherein said control unit further includes a loading board interconnecting fixedly distal ends of said second sidewalls opposite to said base wall along the axis, said resilient element having opposite ends that are secured respectively to said loading board and said abutment wall of said control seat.

6. The electric seasoning mill as claimed in claim 1, wherein said receiving unit includes a hollow body surrounding the axis, and a cover body coupled removably to said hollow body for pressing said abutment wall of said control seat and converting said electric seasoning mill to the power-on state.

* * * * *